Dec. 9, 1958 — B. JARITZ — 2,863,555
BELT CONVEYOR

Filed July 15, 1955 — 2 Sheets-Sheet 1

Inventor
Berthold Jaritz
by Karl Michaelis, Atty.

Dec. 9, 1958  B. JARITZ  2,863,555
BELT CONVEYOR

Filed July 15, 1955  2 Sheets-Sheet 2

United States Patent Office 2,863,555
Patented Dec. 9, 1958

2,863,555

BELT CONVEYOR

Berthold Jaritz, Puttlingen (Saar), Saar Territory

Application July 15, 1955, Serial No. 522,342

Claims priority, application Germany July 21, 1954

6 Claims. (Cl. 198—203)

This invention relates to belt conveyors and more especially to a belt conveyor for the transport of substances over a long distance.

As a rule in such conveyors the belt or band is made of rubber or a rubberized fabric and they are driven almost exclusively by the deviation pulleys mounted at the ends of the band carrying frame.

The low friction set up between the pulley groove and the bottom surface of the band often, owing to the slippage occurring between them, creates electric charges. Apart from this, the band is subject to rapid wear and the driving force is utilized only incompletely. Therefore, in order to increase the friction existing between the band and the driving elements the use of intermediate drives consisting also of endless bands have been found useful.

In the conveyor according to the present invention the increase of friction between the band and the driving elements is obtained with the aid of grooves or ribs projecting from the bottom surface of the conveyor band and extending in the longitudinal direction or the direction of travel of the band. These grooves or ribs may for instance be formed with a trapezoidal cross section and mesh with similar projections on the pulley or other driving element. These grooves or ribs also create a good lateral guidance for the band which will be maintained also in the case of certain deviations from the straight-line travel in horizontal direction. In this manner I obtain a satisfactory frictional contact similar to that provided by a V-belt.

The driving element may be for instance a pulley provided with annular grooves of trapezoidal or similar cross section which are spaced in such a manner that the ribs formed on the bottom surface of the belt enter the grooves similarly as would a V-belt. Similar driving pulleys may also be distributed over the band surface intermediate between the deviating pulleys.

In a further development of this invention there may be arranged in a space between the upper or conveying strand and the lower or slack strand of the band a number of such supporting and driving units in the form of endless belts provided with longitudinally extending meshing and engaging grooves, projections or the like which can engage with sufficient friction similar members on or in the bottom surface of the main belt.

The interengaging elements, instead of consisting of a plurality of adjacent double V-belts or grooves, may be replaced by endless bands formed on their bottom faces with longitudinal ribs of trapezoidal cross section. In order to increase the frictional engagement of these members, they may be formed with similar ribs on the side walls of the grooves or ribs, which engage similar ribs or grooves of the driving pulleys. Instead of this, I may arrange on the inner surface of the intermediate bands ribs which extend parallel with respect to the axes of the pulleys or the like which drive the main belt.

All these double V-belts of the intermediate bands may be combined with separate loose or driven sheaves or pulleys in such a manner that at any point between the deviations pulleys of the endless bands a satisfactory frictional contact is established.

Preferably the diameter of the deviation or the driving pulleys or both are so chosen that also the slack or returning strand of the main belt engages the strand of the intermediate band which travels in the same direction. If desired, pressure rolls arranged on both sides of these strands may increase the frictional contacts. By these arrangements I succeed in avoiding the occurrence of injurious tractional stresses in a belt conveyor which may extend over half a mile.

The relative distance between two intermediate or auxiliary bands may be smaller in rising than in downwardly extending strands.

In shorter band conveyors simple driving or supporting rollers with trapezoidal annular grooves may replace the intermediate bands. In that case frictional arrangement between those pulleys which are arranged between the returning pulleys, and the conveyor belt may be provided for by the weight of the substances or goods being conveyed. In the slack or returning strand pressure rolls which are arranged in front or in the rear of the driving pulleys may generate the required frictional contact. Alternatively springs or weighted levers may furnish the contact pressure by acting on the bottom surface of the returning belt. The deviation pulleys themselves may be provided with annular grooves of trapezoidal cross sections for the same purpose.

The middle section of the rubber belt may preferably be supported and driven with the aid of intermediate bands of rubberized fabric. Similar fabric inserts may be arranged in the lateral portions of the belt to provide for the rigidity required. In view of the greater elasticity provided by such inserts and by inserts extending at an angle to the line of travel the load of the belt may be greater.

In the drawings affixed to this specification and forming part thereof several embodiments of the invention are illustrated diagrammatically by way of example.

Fig. 2 is a cross section on the line II—II in Fig. 1, drawn to a large scale, while

Figure 1:
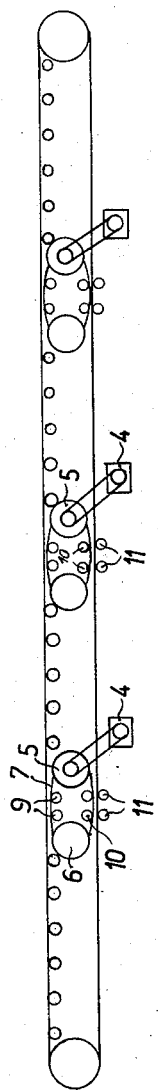
Fig. 1 is a purely schematical illustration of a belt conveyor of the kind here in view.
Figure 2:
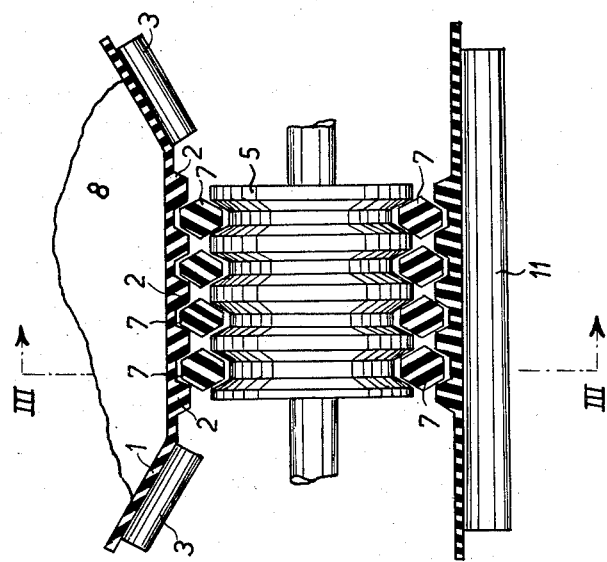
Figure 3:
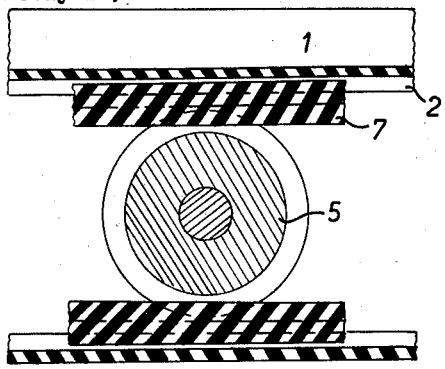
Fig. 3 is a cross section along the line III—III in Fig. 2.

Referring to the drawings and first to Figures 1–3, 1 is the main conveyor belt formed on its bottom surface with projecting ribs 2 of trapezoidal cross section. Its lateral sections rest and run on inclined loose rollers 3.

The horizontal rollers supporting the middle portions of the belt may be formed with a profile fitting the profile of the bottom side of the belt. In order to avoid losses of frictional contact, the dimensions of the annular grooves of V or trapezoidal cross sections on the middle rolls or pulleys should be so chosen that substantially only the horizontal bottom faces of the grooves of the belt between them contact the grooves of the belt.

The main belt may be driven for instance with the aid of three caterpillar drives driven by motors 4 through suitable reducers.

The driving pulley 5 is formed with a profile corresponding to the profile of the bottom face of the belt 1. The deviation pulley 6 may, if desired, be formed with a similar profile.

On the pulleys 5 and 6 run four double V-belts 7 which are applied to the V-grooves between the projections 2 of the belt.

A satisfactory frictional contact between these projections and the tops of the V-belts 7 is obtained by the weight of the material 8 being conveyed by the belt, thereby securing such contact over the entire distance between the pulleys 5 and 6. Two or more supports 9 may be provided between these pulleys.

In order that the slack or returning part of the belt be also carried along by the double V-belts 7, pressure rollers 10 and 11 (Figs. 1 and 2) may be provided above the V-belts and below the returning part of the main belt.

Figure 4:
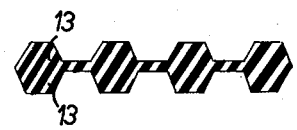
Fig. 4 is a cross section of a modified form of an endless band.

Fig. 4 illustrates an endless caterpillar band in which instead of the double V-belts of Fig. 2 a band with trapezoidal ribs 12 and 13 on both the top and bottom faces is used, which mesh with the longitudinal grooves of the main belt and with the annular grooves of the pulleys. Similar pulleys may also be arranged at different places to act as intermediate drives, and they may be combined also with pressure rolls.

I wish it to be understood that I do not desire to be limited to the details described in the foregoing specification and shown on the drawings, for obvious modification will occur to persons skilled in this art.

I claim:

1. A belt-conveyor comprising an endless conveyor belt, driven endless band means underneath at least a part of said belt in frictional engagement with the opposite belt surface of said part for supporting said belt and driving it, said belt being formed on said surface with a plurality of projecting ledges of substantially trapezoidal cross section and grooves of trapezoidal cross sections therebetween, said band means having a belt engaging surface with grooves and ledges therebetween having cross sections complementary to said belt surface and being respectively engaged with said ledges and said grooves of said belt surface, a driving roller for said band means frictionally engaging and driving it, said driving roller having a band means engaging surface with a plurality of trapezoidal grooves, and said band means having a roller engaging surface of complementary cross section to said roller surface.

2. A belt-conveyor according to claim 1, wherein said ledges and said grooves are running substantially in the direction of travel of said belt.

3. A belt-conveyor according to claim 1, said band means comprising a plurality of bands, each of said bands having a trapezoidal cross section engaging one of said grooves.

4. A belt-conveyor according to claim 3, wherein each of said bands has a substantially hexagonal cross section.

5. A belt-conveyor according to claim 1, said band means comprising an integral band having on its belt-engaging surface a plurality of trapezoidal projecting ledges and trapezoidal grooves therebetween, said latter ledges engaging into said grooves of said belt surface.

6. A belt-conveyor according to claim 5, wherein the opposite side of said belt-engaging surface of said band means is provided with a plurality of trapezoidal projecting ledges and trapezoidal grooves therebetween at the locations of said ledges and grooves on said belt-engaging surface.

References Cited in the file of this patent

UNITED STATES PATENTS

| 1,626,041 | Kyle | Apr. 26, 1927 |
| 1,656,628 | Gits | Jan. 17, 1928 |
| 1,776,419 | Dodge | Sept. 23, 1930 |
| 2,650,695 | Robins | Sept. 1, 1953 |

FOREIGN PATENTS

| 684,163 | Great Britain | Dec. 10, 1952 |